May 20, 1969     C. H. OSBORN     3,445,308
METHOD OF MAKING CORRUGATED FLEXIBLE HOSE
Original Filed June 8, 1964     Sheet 1 of 2
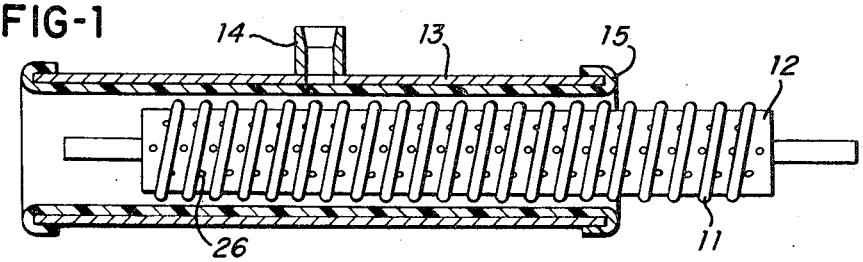
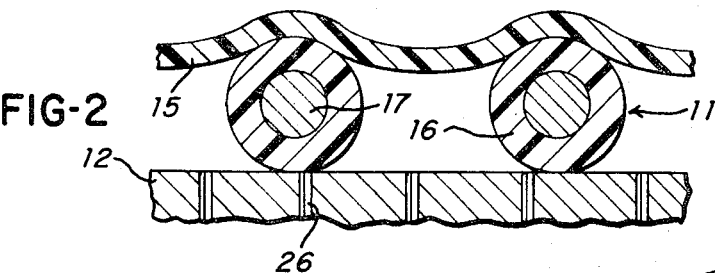
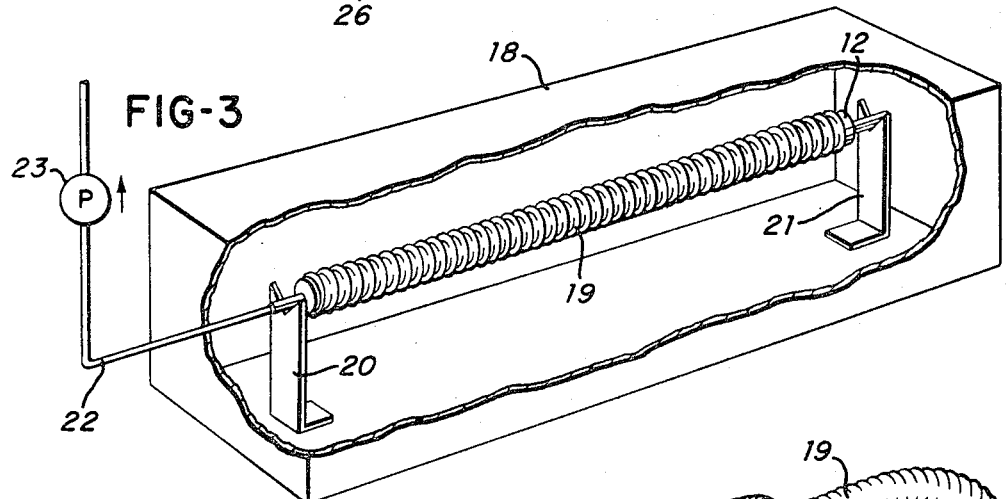
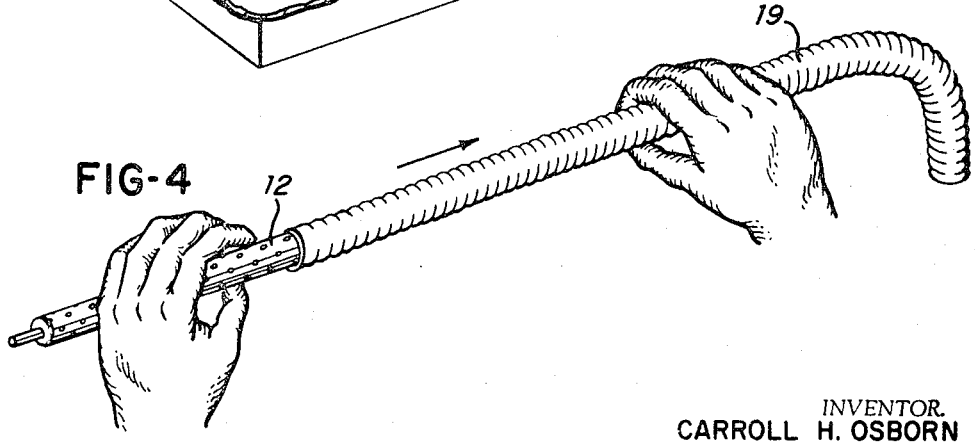
INVENTOR.
CARROLL H. OSBORN
BY
Reuben Wolk
ATTORNEY May 20, 1969  C. H. OSBORN  3,445,308
METHOD OF MAKING CORRUGATED FLEXIBLE HOSE
Original Filed June 8, 1964
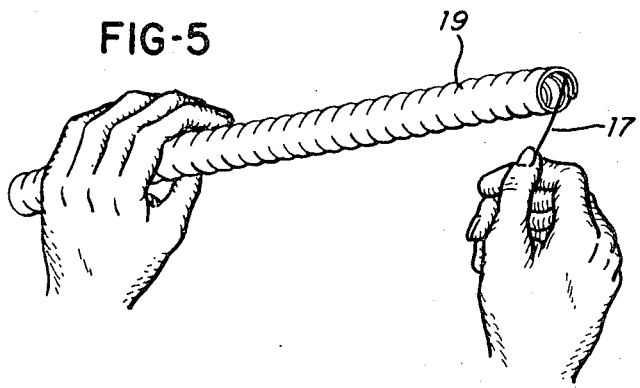
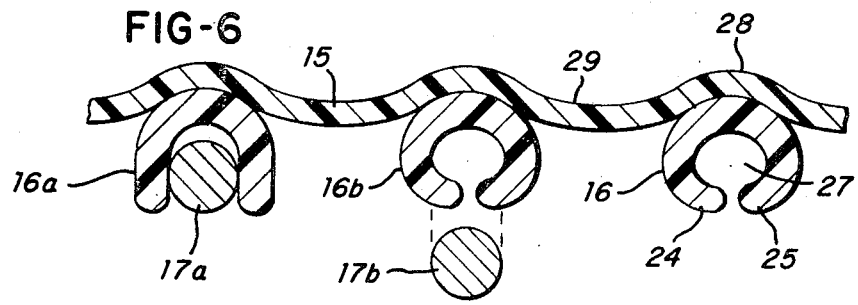
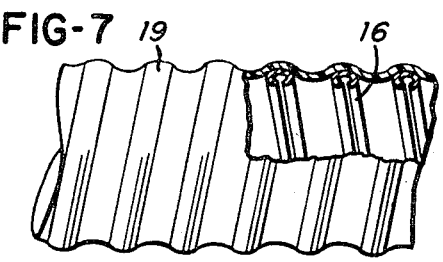
INVENTOR.
CARROLL H. OSBORN
BY
Reuben Wolk
ATTORNEY

# United States Patent Office 3,445,308
Patented May 20, 1969

3,445,308
METHOD OF MAKING CORRUGATED
FLEXIBLE HOSE
Carroll H. Osborn, Waynesville, N.C., assignor to Dayco Corporation, a corporation of Delaware
Original application June 8, 1964, Ser. No. 373,257, now Patent No. 3,329,172, dated July 4, 1967. Divided and this application Jan. 10, 1967, Ser. No. 627,571
Int. Cl. B29c 17/00
U.S. Cl. 156—86                                                4 Claims

ABSTRACT OF THE DISCLOSURE

A method of manufacturing corrugated hose including the steps of coating a heat-shrinkable cord with an elastomer, forming this coated cord into a helical reinforcing coil, and placing an elastomeric tube over the coil. The tube is shrunk over the body to create corrugations and subsequent heat is applied to cause the cord to shrink and cut through the coating, thus leaving the coating in an arcuate shape to create the final reinforcing member.

---

This application is a division of U.S. application Ser. No. 373,257, filed June 8, 1964, now U.S. Patent No. 3,329,172.

This invention relates to a hose for conveying fluids such as air, and the method of manufacturing same. More particularly, the invention relates to a fluid-impervious hose containing a radial reinforcement to withstand pressure and prevent collapse when used in low pressure vacuum systems, oxygen systems, hair dryers, respirating devices, and the like.

The type of hose referred to herein usually comprises an elastomeric flexible tube which is reinforced against radial collapse by a reinforcing member comprising axially spaced helical coils extending throughout its length. While the hose of the present invention may be made or constructed by any of several different methods, the preferred form of the invention will refer to a hose which is similar in construction to those more fully described in United States Patents Nos. 2,766,806, 2,780,803, and 2,822,857, of common assignment. This is the type of hose which has found wide acceptance because of its lightness and strength, and the fact that it is sufficiently flexible to permit bending and yet impervious to leakage of fluid. At the same time, the use of the reinforcing coil will prevent collapse of the tube. The above-described hose has an outer tubular member made of a thermoplastic material such as polyvinyl chloride, or other vinyl polymers or copolymers, or the polyolefins such as polyethylene or polypropylene. If desired, the outer tubular member may consist of a blend of these materials or may include these materials blended with synthetic or natural rubbers. In the conventional hose of this type the reinforcing member usually consists of a steel wire which has been coated with an elastomeric material similar to that of the tubular member and formed into the reinforcing member referred to above.

The hose of the present invention represents an improvement over the prior art in providing hose of the type generally described above except that it utilizes a reinforcing member which is considerably lighter in weight than the conventional wire reinforcing member. Lighter weight hose creates a number of advantages; for example, when using such a hose in a household type hair dryer the hair dryer bonnet attached to the hose has less tendency to be displaced from the head by head movements than would occur with a conventional hose. When such a hose is used for other purposes, such as vacuum cleaners, it reduces the amount of weight which must be carried around by the user.

In addition to the lightness of weight, the hose provided by the present invention presents an additional advantage in that it eliminates any metallic substance from the finished hose. This may be an important factor in certain uses where there is a possibility of accidental electrical conduction, or burns which might be received through accidental exposure to induction heating.

According to the present invention the above hose may be manufactured in a very simple manner, and yet the final product is one which has great utility, particularly where lightness of weight is extremely important.

It is, therefore, a primary object of the present invention to provide a fluid-impervious noncollapsible hose which is reinforced against radial compression.

It is an additional object of this invention to provide such a hose which is extremely light in weight.

It is still another object of the invention to provide a simple method of manufacturing such a hose.

These and other objects will be apparent in the following specification, claims, and drawings, in which:

FIGURE 1 is an elevational view in partial cross section illustrating the first step in the manufacture of the hose.

FIGURE 2 is an enlarged sectional view of a portion of the novel hose during a later stage of construction.

FIGURE 3 is a perspective view partially broken away to illustrate the positioning of the hose during a subsequent step in the construction.

FIGURES 4 and 5 are perspective views illustrating further steps in the construction of the hose.

FIGURE 6 is an enlarged sectional view of a portion of the hose during the last step of the construction which occurs as shown in FIGURE 5.

FIGURE 7 is a perspective view in partial section illustrating the finished hose.

Referring now to the drawings and particularly to FIGURE 1, reference numeral 11 designates a reinforcing member consisting of axially spaced helical coils. The construction of this reinforcing member will be described below. This member 11 has been subjected to a spring winding operation whereby the helical configuration is obtained and in which the turns of the coils of the reinforcing member are approximately equally spaced in an axial direction. This reinforcing member is placed upon a mandrel 12 which consists of a cylindrical member, usually steel, upon which the hose is built. The mandrel and reinforcing member are placed within a vacuum box 13 which consists of a hollow cylindrical member having an opening 14 which is connected to an external vacuum pump in order to evacuate the interior of the vacuum box. A tubular member 15 has previously been inserted within the vacuum box and the ends cuffed over the wall of the vacuum box as shown in FIGURE 1. With this relationship, evacuation of air from the vacuum box by means of the opening 14 will cause the tubular member 15 to expand against the inner surface of the vacuum box. The tubular member 15 is preferably of thermoplastic material such as polyvinyl chloride, other vinyl polymers or copolymers, or polyolefins such as polyethylene or copolymers. Such materials have an excellent elastic memory and therefore may be easily expanded to the position shown and subsequently returned to the original diameter. The tubular member is preferably formed by extrusion, as described in the abovementioned patents.

After insertion of the mandrel and reinforcing member within the vacuum box having the expanded tubular member 15, the vacuum is released therefore allowing the member 15 to again contract to its original diameter upon the mandrel and to surmount the coils of the reinforcing member 11. This process is more fully described in the above-referenced patents, but is also illustrated in the enlarged showing of FIGURE 2 in which the relationship between the outer tubular member, the reinforcing member, and the mandrel is clearly seen.

As shown in FIGURE 2, the reinforcing member 11 consists of a central member 17 and an outer coating 16. While in the prior art the central member would normally be a steel wire, the present invention provides for this to be of an entirely different material and to embody an entirely different concept. In the present application this member 17 is a nylon or polypropylene monofilament cord, preferably about .030 inch in diameter, but may be a cord of some other material, which is also heat shrinkable, such as fiber glass filaments which have been twisted into a single cord of approximately the same diameter. The nylon or glass fiber cord has been coated by the material 16 which is preferably polyvinyl chloride, but may be any of the other materials used for the outer tubular member 15. The preferable form of the invention requires that the coating 16 be similar to the tubular member 15. After coating, the assembly of cord 17 and coating 16 is approximately .060 inch in diameter.

The next step of the invention is illustrated in FIGURE 3 in which the assembly of the reinforcing tubular member and the mandrel has been placed within a heated chamber 18. The assembly of the tubular member and reinforcing member is designated by reference numeral 19. Mounted within the heating chamber 18 are supports 20 and 21 upon which the shafts of the mandrel may be supported during heating. The mandrel 12 has a hollow interior and to one end is attached a pipe 22 which leads to a source of vacuum 23. The heating chamber is preferably a hot air curing oven, such as more fully described in the above patents, and capable of creating sufficient temperature to soften the plastic materials used for the construction of the hose. For example, when using polyvinyl chloride for the tubular member 15 and the coating material 16, a temperature of 300° F. plus or minus 10° F. is found to produce satisfactory results. It should be noted that the use of a chamber of this nature is not essential, as it is also possible to heat the assembly by means of infrared lamps or other conventional methods. However, the softening temperature is imposed upon the assembly 19 and when this occurs the tubular member 15 and the coating material 16 are at the point of plastic flow so that they may be bonded to each other over selected areas, which may be predetermined by the exact temperatures and vacuum pressures which are imposed. At this point vacuum is applied to the pipe 22 from the outside source 23 and simultaneously to the interior of the mandrel 12. By means of a series of apertures 26 in the mandrel the same vacuum is applied within the tubular member 15 so that it is pulled radially inward to create the required convoluted shape. The combination of the radially inward pressure created by the vacuum and the condition of plastic flow will create a bond between the coating and the outer tubular member. As a next step the assembly will be cooled, which may be done by several methods; for example, the supply of heat may be shut off to the heating chamber and the assembly may be allowed to cool naturally, or cooling air may be circulated within the chamber to hasten this process. The vacuum may be retained or may be released depending on the amount of bonding which is desired. It is also possible to cool the assembly by removing it from the chamber and placing it under cold water or other cooling medium. It is also feasible to eliminate the vacuum drawing process just described, and to allow the elastic memory of the tubular member to create a temporary bond between the tubular member and the helical coils. The step of heating as previously described will then create the permanent bond and shrinkage of the cord as before, followed by the steps previously described.

When the cooling is completed, the hose assembly 19 is stripped from the mandrel 12 as shown in FIGURE 4 by pulling it off by hand; or alternatively, by using a simple mechanical stripping device. During the heating and cooling process the cord 17 has shrunk, causing it to split out of its coating and to assume the position designated in FIGURE 6 by cord 17a and coating 16a. Because of the shrinkage, there is a more or less consistent inward radial motion of the cord 17 throughout its length so that it has cut completely through the inner surface of the coating. By grasping one end of the cord 17 the operator may then very simply pull out the entire member as shown in FIGURE 5; this member will tend to be pulled further inward as shown by the cord designated as 17b and the coating 16b of FIGURE 6. As a result, the coating 16 will then have an arcuate configuration formed by the inward ends 24 and 25 which define an inwardly extending loop or open portion 27. The outer surface of the coating conforms to the outwardly extending corrugations 28 of the tubular member 15, while the corrugations 29 of the member 15 extend inwardly between the turns of the helical member. The resultant coated member 16 thus provides the sole helical reinforcement for the final assembly and has an arcuate configuration, the outer surface thereof being bonded to the inner surface of the tubular member 16. It should be noted that the portion of the hose shown in FIGURE 6 is shown in somewhat extended state because of the slight tension created by pulling free the cord 17. In a relaxed condition, however, the hose 19 will appear as shown in FIGURE 7, in which the inner convolutions of the tubular member 15 extend nearly to the inner plane of the coated member 16. The resultant product is one having a continuous reinforcing member which provides resistance to radial forces and yet is considerably lighter than prior art hose because of the absence of any central reinforcing member.

While the invention has been described above with reference to manufacturing the hose by the use of a preformed tubular member, it should be noted that the invention specifically contemplates the formation of the hose initially by other methods. For example, a strip consisting of a plastic material and a cord, such as the cord 17 in the present invention, may be extruded and spirally overlapped by the method described in United States Patent No. 2,798,508. Subsequently, the same process as described above will take place, causing the cord to be stripped from the final assembly. It is also possible to form a continuous hose by extruding the outer tubular member over the cord 17 as shown, for example, in United States Patent No. 2,963,749, then subsequently stripping out the cord by the method described above. The essential principle of manufacture and the final product involve the concept of creating a reinforcing member which is light in weight compared to the prior art products. Other variations in method of manufacture and in the finished product are contemplated as being within the scope of the present invention.

What is claimed is:

1. A method of manufacturing corrugated flexible hose comprising the steps of coating a heat-shrinkable cord with an elastomeric material, forming said coated cord into a reinforcing member having axially spaced helical coils, surmounting said member with an elastomeric body to form a hose assembly, contracting said body over said coils to create corrugations conforming to said coils, and subjecting said assembly to sufficient heat to cause said cord to shrink radially inward and cut through said coating material, said shrinkage creating an arcuate configuration in said coating material corresponding to said corrugations.

2. The method of claim 1 in which said cord is nylon.

3. The method of claim 1 in which said cord is composed of twisted glass fiber filaments.

4. A method of manufacturing corrugated flexible hose comprising the steps of coating a heat-shrinkable cord with an elastomeric material, forming said coated cord into a reinforcing member having axially spaced helical coils, surmounting said member with an elastomeric body to form a hose assembly, contracting said body over said coils to create corrugations conforming to said coils, bonding said body to said member to form an assembly thereof, shrinking said cord radially inward and cutting through said coating material, and removing said cord to form said coating material into coils having an arcuate cross section with an inwardly extending open portion and an outwardly extending closed loop portion, said corrugations conforming to said closed loop portion.

References Cited

UNITED STATES PATENTS

| | | | |
|---|---|---|---|
| 3,296,047 | 1/1967 | Parr | 156—143 XR |
| 3,105,492 | 10/1963 | Jeckel | 138—122 XR |
| 2,949,133 | 8/1960 | Rothermel et al. | |

FOREIGN PATENTS 453,303    9/1936    Great Britain.

PHILIP DIER, *Primary Examiner.*

U.S. Cl. X.R.

156—144, 287; 264—94